Patented Mar. 23, 1937

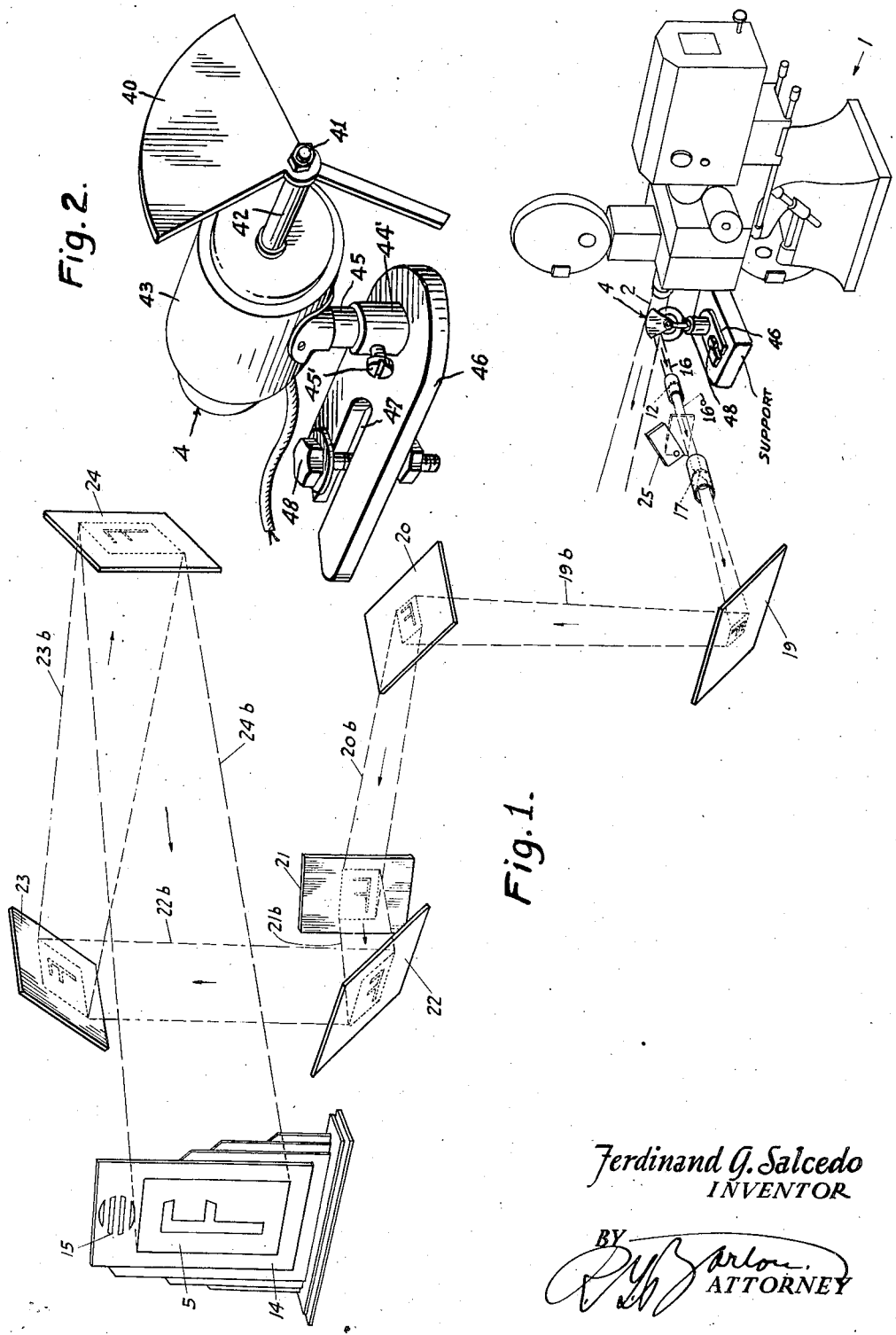

2,074,991

UNITED STATES PATENT OFFICE 2,074,991

AUXILIARY PICTURE REPRODUCING APPARATUS

Ferdinand G. Salcedo, Hollywood, Calif., assignor to Royal Revues, Inc., a corporation of Michigan Application May 21, 1934, Serial No. 726,788

1 Claim. (Cl. 88—24)

This invention relates to means for reflecting light from the beam radiating from a projection lantern so that the picture projected may be projected on two screens.

More particularly the invention relates to a revoluble reflecting mirror and stand therefor, the stand being arranged so that the mirror may be adjusted to desired relation with the light beam and there held.

This invention will be better understood from the following description when considered in connection with the accompanying drawing and the scope thereof will be particularly pointed out in what is claimed.

In the drawing—

Fig. 1 represents a diagrammatic perspective view of the assembly which through actual tests has been found most desirable to effect the dual sharp projection in question.

Fig. 2 is an enlarged perspective view of the reflecting device used herein.

Referring in detail to the drawing, in Fig. 1 is shown a bioscope 1, which projects rays 2 whereby a moving picture is directed upon a miniature screen (not shown).

The reflector device is indicated in general at 4.

In the drawing the mirror 40 of the device 4 is shown placed at 45 degrees to the main beam of light 2. This mirror directs a portion of the main beam 2 as a narrow beam of light on to the first lens 12. Said lens 12 concentrates the ray of light thus reflected and produces a small real image just beyond said lens 12, approximately at 16a, in the diverted beam of light. Lens 12 should be an anastigmatic lens F/2.5 or faster. The focal length of lens 12 should be reduced as much as possible in order to create at 16a as small an image as possible.

A focusing lens 17 picks up the image F created by lens 12 at 16a, and projects said image upon the first mirror 19. Upon encountering mirror 19, the image will be inverted.

Mirror 19 is placed at an angle of 45 degrees with relation to the light beam so as to direct the beam, now designated 19b, upwardly upon a second mirror 20, the latter mirror being so positioned that the beam, designated 20b, is diverted in a generally horizontal direction, substantially as shown.

At this stage of its advance the image F has been turned from its upright position thru an angle of ninety degrees, that is to say, a quarter of a turn. The reflected beam next encounters the third mirror 21. This mirror directs the beam, now designated 21b, approximately horizontally upon the fourth mirror 22. From mirror 22 the beam, as 22b, is directed upwardly against the fifth mirror 23, thence, as beam 23b in a backwardly horizontal direction against the sixth and final mirror 24, whence as beam 24b it is projected upon the subsidiary screen 5 mounted upon the panel 14. Hence it will be seen that, after passing thru a plurality of lenses and being reflected from one to another of a series of mirrors, as may be necessary to avoid intervening opaque objects, the image received by the mirror or reflector 40, is finally directed upon the subsidiary or auxiliary screen 5 shown at the left end of Fig. 1. Said screen 5 is shown mounted within an ornamental panel 14 which presumably will be located in front of the theater. A speaker grill 15 is shown in said panel above said screen.

A shutter or beam obstructing device 25 is provided for the purpose of intercepting the deflected ray 16, desirably between the lenses 12 and 16. Whenever said shutter is closed the picture on the subsidiary screen 5 is obliterated. If desired, said shutter may be electrically operated by remote control.

An enlarged view of the beam deflecting device is disclosed in Fig. 2 where a segmental, rotary mirror 40 is shown. Said mirror has its apex portion furnished with a hub 41 which is secured to the shaft 42 of a motor 43, a counterweight arm 44 projecting from the opposite side of said hub. The motor shank 45 is shown adjustably supported in a turnable and extensible manner upon the motor base 46. This adjustment is provided for by a sleeve 44' to receive the stem or shank 45, and suitable means as a set screw 45' is employed to secure the stem in the sleeve. Said base is shown having a slot 47 to receive a bolt 48 whereby the whole motor unit may be adjustably secured to a suitable support. The motor must, of course, be mounted out of the path of the light ray which is to be intercepted by the rotatable mirror 40.

As the motor rotates the segmental mirror 40 rapidly across the beam 2, for successive very small time intervals it deflects the entire beam. When, as shown, the segmental mirror 40 is shaped as substantially a quadrant, it will reflect one-fourth of the light which it intercepts.

The operation of said mirror 40 will not interfere materially with the simultaneous projection of the moving pictures upon the main screen. By increasing the speed of the motor a more persistent picture on the subsidiary screen will be obtained the brilliancy of which will be directly proportional to the size in degrees of the sector of the revolving target used.

It is intended that the motor, used to operate the rotary mirror 40, be equipped with an adjustable speed-varying device in order to obtain as high or as low a speed as the system may require.

I claim:

The combination with a projection lantern adapted to project a light beam, of means to intercept and reflect the emitted rays at spaced time intervals, said means comprising a support in front of said lantern and below said beam of light, an elongated base member resting on said support and having an elongated slot at one end, a clamping bolt extending through said slot and engaging said support, said bolt serving to clamp said base in any desired position of angular and longitudinal adjustment, a sleeve projecting upwardly from said base at the end opposite said slot, a stem slidably and revolubly mounted in said sleeve, means to secure said stem in desired position vertically and rotatably, an electric motor fixed on the upper end of said stem with the motor axis at right angles to the axis of the stem, said motor having a shaft, and a mirror segment fixed to said shaft in a plane at right angles thereto to intercept the light from the projector.

FERDINAND G. SALCEDO.